United States Patent [19]

Dusa

[11] 4,050,242
[45] Sept. 27, 1977

[54] MULTIPLE BYPASS-DUCT TURBOFAN WITH ANNULAR FLOW PLUG NOZZLE AND METHOD OF OPERATING SAME

[75] Inventor: Donald J. Dusa, Cincinnati, Ohio

[73] Assignee: General Electric Company, Cincinnati, Ohio

[21] Appl. No.: 636,442

[22] Filed: Dec. 1, 1975

[51] Int. Cl.² ............................ F02C 3/06; F02K 3/06
[52] U.S. Cl. .................................. 60/204; 60/226 R; 239/265.39
[58] Field of Search ................. 60/204, 226 A, 226 R, 60/262; 239/265.19, 265.39

[56] References Cited

U.S. PATENT DOCUMENTS

| | | | |
|---|---|---|---|
| 3,374,631 | 3/1968 | Marks | 239/265.19 |
| 3,612,400 | 10/1971 | Johnson et al. | 60/226 R |
| 3,797,233 | 3/1974 | Webb et al. | 60/226 R |
| 3,854,286 | 12/1974 | Klees | 60/226 A |
| 3,879,941 | 4/1975 | Sargisson | 60/226 R |
| 3,893,297 | 7/1975 | Tatem et al. | 60/39.66 |
| 3,938,328 | 2/1976 | Klees | 60/226 R |

Primary Examiner—Carlton R. Croyle
Assistant Examiner—Robert E. Garrett
Attorney, Agent, or Firm—Robert C. Lampe, Jr.; Derek P. Lawrence

[57] ABSTRACT

A propulsion nozzle having a substantially cylindrical translatable shroud partially defining an outer flow duct and an articulated plug mounted within the shroud to partially define an inner coannular flow duct. A variable position valve comprises the downstream portion of the common wall between the ducts for modulating the relative flow rates between ducts and for creating a favorable static pressure balance therebetween. The shroud and plug cooperate to form a variable area throat for the combined duct flows.

8 Claims, 3 Drawing Figures

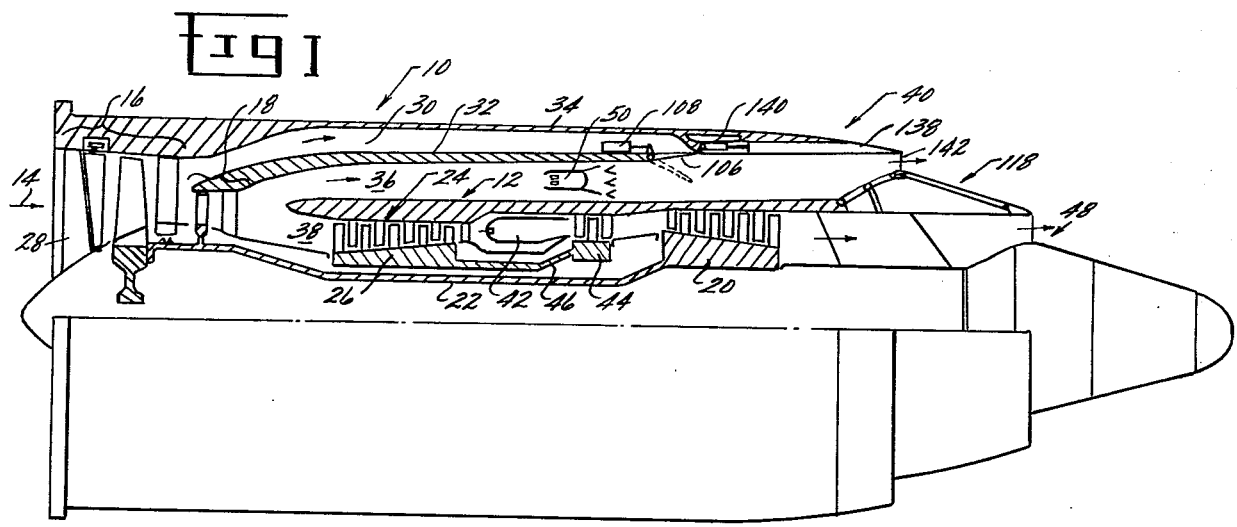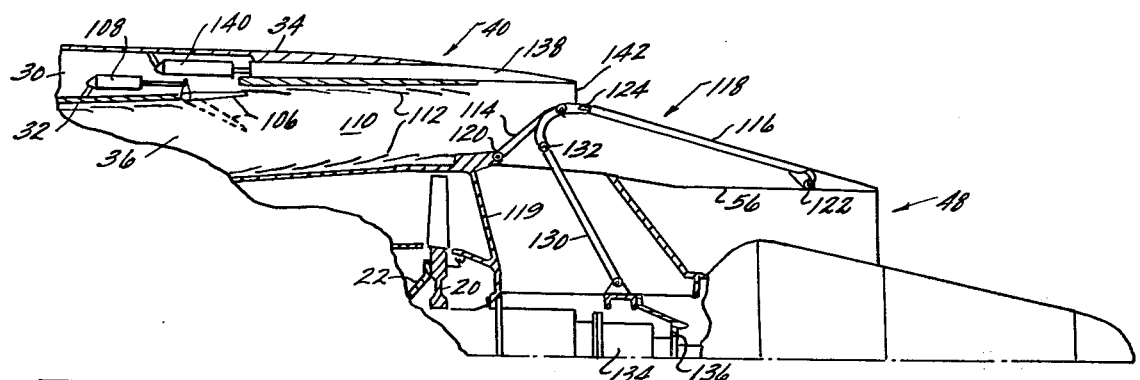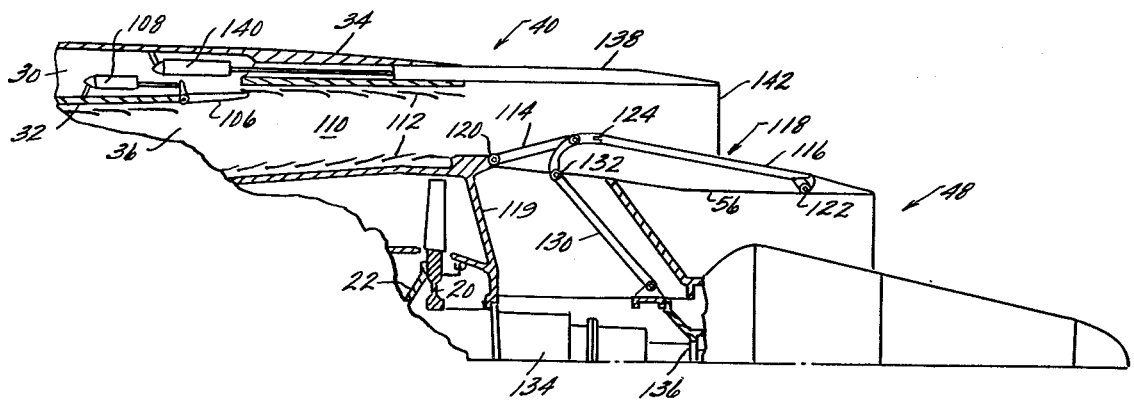

MULTIPLE BYPASS-DUCT TURBOFAN WITH ANNULAR FLOW PLUG NOZZLE AND METHOD OF OPERATING SAME

BACKGROUND OF THE INVENTION

This invention relates to gas turbine engine exhaust nozzles and, more particularly, to high performance exhaust nozzles of the variable area variety.

The invention herein described was made in the course of or under a contract, or a subcontract thereunder, with the United States Department of the Air Force.

Exhaust systems are provided for gas turbine engines to direct the rapidly moving exhaust gases rearward into the atmosphere at a velocity and density necessary to produce the required thrust. The advent of new aircraft capable of flying advanced missions, with attendant high aerodynamic loading, requires the development of new propulsion system cycles, and has led to the need for new and unique exhaust nozzle systems. The requirements of the aircraft mission cannot be overlooked in the design of the exhaust system since the mission has a direct and formidable impact on both the performance and mechanical design requirements of the exhaust nozzle system. In particular, the mission impacts the nozzle design in two major areas: exhaust systems performance distribution throughout the flight envelope and exhaust system weight.

The performance of an exhaust nozzle is dictated, to a large extent, by the exhaust nozzle area. The choice of nozzle area is determined by the temperature, mass airflow, velocity and pressure of the exhaust gases. Where the operating range of a gas turbine engine is relatively narrow, the area is optimized at the time of manufacture, and the minor benefits obtainable in performance by providing a variable area capability are offset by increased weight and complexity penalties. However, in modern, high performance engines with broad operating ranges, noise, thrust and fuel economy benefits may be achieved by use of variable area nozzles. In particular, nozzle performance and efficiency is dependent upon matching nozzle throat area (minimum flow area) and nozzle exit area as a function of pressure ratio across the nozzle.

The weight of an exhaust nozzle is dictated, to a large extent, by the complexity of the system in response to an attempt to improve nozzle performance and the structural hardware required to maintain integrity due to loading created by both the exhaust stream and high performance aircraft maneuvering. High maneuver loads by the aircraft cause large pressure differentials and, thus, high nozzle structural loading. To counteract these loadings, the exhaust system's structure and actuator systems require increased strength and, thus, increased weight. Clearly, in aircraft systems where weight is a paramount design consideration, the lightest weight exhaust system is desirable. However, in order for an exhaust system to be a viable concept, it must be mechanically feasible. By this, it is meant that the system must integrate well with both the engine and airframe, must act as a sufficient pressure vessel, and must provide for realistic actuator systems to avoid weight penalties and mechanical instabilities.

It becomes apparent, therefore, that a dichotomy exists when considering exhaust nozzle designs for advanced high performance aircraft since high multimission performance is only attainable with complicated and, thus, relatively heavy exhaust systems. Resolution of this problem requires extensive analysis and iteration of the aircraft mission requirements, the engine performance cycle, and the possible exhaust nozzle configurations.

The requirements of anticipated aircraft missions preclude the utilization of conventional nozzle systems. The convergent nozzle which is commonly used for subsonic flight loses its efficiency because the exhaust stream velocity cannot exceed sonic velocity (Mach number equals one). The convergent-divergent exhaust nozzle permits controlled expansion and acceleration of the exhaust gases after they reach sonic velocity, but these nozzles have a very narrow optimum operating range and must be designed as variable area nozzles to compensate for this characteristic. While such variable area nozzles have been considered in the past, heretofore no exhaust nozzle schemes have been found to be satisfactory for adaptation to a wide range of anticipated future aircraft missions using duct burning turbofan engines.

The problem becomes compounded in engines of the multiple bypass type wherein, in general, the number of nozzles is equivalent to the number of flow ducts within the engine. This is necessitated by the large differences in flow properties between each stream for most engine cycles which generally makes it impractical to combine these flows within the ducts. However, as the number of nozzles increases, so does the engine weight. Therefore, a system is required which provides flow modulation between multiple ducts, which is of relatively simple and lightweight design, and which provides the necessary area variation throughout the mission cycle.

SUMMARY OF THE INVENTION

Accordingly, it is the primary object of the present invention to provide a high performance, variable area gas turbine engine exhaust system of reduced complexity and weight.

It is a further object of the present invention to provide a simplified variable area exhaust system for a multiple bypass engine.

It is yet another object of the present invention to provide a method for operating a variable area propulsion nozzle for a multiple-bypass gas turbine engine.

These and other objects and advantages will be more clearly understood from the following detailed description, the drawings and specific examples, all of which are intended to be typical of rather than in any way limiting to the scope of the present invention.

Briefly stated, the above objectives are accomplished in a multiple-bypass engine wherein the fan flows, inner and outer, are contained in coannular ducts comprising three generally coaxial walls. The inner wall comprises two linkage-actuated, articulated flaps which form a variable geometry annular fan plug to provide nozzle throat area modulation capability. The outermost wall comprises a translatable shroud which provides area ratio variability for the combined expansion of the fan flows. The intermediate wall terminates in a variable position flap comprising a valve upstream of the nozzle throat which may be positioned to cooperate with the outer wall to preclude flow through the outer duct, or which may be positioned to permit mixing of the outer and inner duct flows upstream of the nozzle throat.

In the anticipated configuration, wherein the inner duct includes a combustor to augment the energy level of the inner duct stream in the supersonic mode, the variable position flap is in the closed position relative to the outer duct and a translatable shroud is extended aft of the nozzle throat. The translatable shroud and the variable geometry fan plug provide the throat area and nozzle exit area ratio variability for the fan nozzle to operate at its peak performance characteristic. In the subsonic cruise mode wherein the inner duct burner is inoperative and the engine bypass ratio (ratio of fan bypass flow to core flow) is high, the outer duct stream is mixed aft of the inner duct burner by means of the variable position flap which creates a favorable static pressure balance at the mixing plane. The combined fan flows are then exhausted through the single fan duct nozzle formed by the translatable shroud trailing edge (the shroud being essentially stowed) and the annular fan plug. The annular fan plug is positioned by actuators and linkage to its optimum position as a function of operating condition.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 1 is a side profile in partial cutaway schematically depicting a gas turbine engine incorporating the subject invention;

FIG. 2 is an enlarged schematic view depicting the exhaust nozzle of the engine of FIG. 1 in one operating mode; and FIG. 3 is an enlarged view, similar to FIG. 2, depicting the exhaust nozzle in another operating mode.

DESCRIPTION OF THE PREFERRED EMBODIMENT

Referring to the drawings wherein like numerals correspond to like elements throughout, attention is first directed to FIG. 1 wherein a gas turbine engine, depicted generally at 10, and which can embody the present invention, is diagrammatically shown. This engine may be considered as comprising generally a core engine 12, a fan assembly 14 including fan stages 16 and 18, and a fan turbine 20 which is interconnected to the fan assembly 14 by shaft 22. The core engine 12 includes an axial flow compressor 24 having a rotor 26. Air enters inlet 28 and is initially compressed by fan stage 16. A first portion of the compressed air enters the outer fan bypass duct 30 defined, in part, by annular wall 32 and a circumscribing fan nacelle 34. A second portion of the air is further compressed by fan stage 18 whereupon it is again split into portions, one portion entering inner bypass duct 36 defined, in part, by core engine 12 and circumscribing wall 32, and another portion entering core engine inlet 38. The flows in ducts 30 and 36 are ultimately discharged through the fan exhaust nozzle, depicted generally at 40.

Compressed air entering inlet 38 is further compressed by the axial flow compressor 24 and then is discharged to a combustor 42 where fuel is burned to provide high energy combustion gases which drive a turbine 44. The turbine 44, in turn, drives the rotor 26 through a shaft 46 in the usual manner of a gas turbine engine. The hot gases of combustion are then passed to and drive the fan turbine 20 which, in turn, drives the fan assembly 14. A propulsive force is thus obtained by the action of the fan assembly 14 discharging air from ducts 30 and 36 through fan exhaust nozzle 40 and by the discharge of combustion gases from a core engine exhaust nozzle indicated generally by 48. For increased thrust, the energy level of the air in duct 36 may be augmented by means of an auxiliary combustor (or duct burner) 50.

The above description is anticipatory of many future gas turbine engines of the "variable cycle" or "multiple bypass" type and is not meant to be limiting as it will become readily apparent from the following description that the present invention is capable of application to any gas turbine engine and is not necessarily limited to the embodiment depicted in FIG. 1. The foregoing description, therefore, is merely meant to be illustrative of one type of application.

Directing attention now to the fan nozzle 40 of FIGS. 2 and 3, there is depicted therein a double annular bypass configuration comprising coannular outer bypass duct 30 and inner bypass duct 36 as previously described and having a common intermediate annular wall 32. Wall 32 is shown as terminating in a variable position flap 106 comprising a valve, the flap being positionable by means of actuator 108 to cooperate with a portion of the outer fan nacelle 34 to preclude flow through outer duct 30, or which may be positioned to permit mixing of the outer and inner duct flows upstream of the nozzle throat. Thereafter, the combined flows exhaust through exhaust duct 110 to the atmosphere.

As depicted in FIG. 1, inner duct 36 is provided with a duct burner 50 to augment the energy level of the inner duct flow to provide increased thrust in the supersonic mode. Accordingly, the duct 110 is provided with a known thermal liner 112 for cooling purposes as is well understood in the art.

The radially inner wall of duct 110 terminates in two linkage actuated articulated flaps 114 and 116 which form a variable geometry annular fan plug indicated generally as 118. The forwardmost flap 114 (to the left in FIG. 2) is hinge connected to a rigid structure such as strut 119 at 120 while the aft end of flap 116 is hinge connected to a stationary shroud 56 at 122. Flaps 114 and 116 are interconnected by means of an articulated joint 124 comprising a cooperating cam and track arrangement. Link 130 is operatively connected to flap 114 at 132 and transfers motion from an actuator 134 to flap 114. In particular, as actuator 134 translates carriage assembly 136 forward and aft, the fan plug 118 is caused to move radially outwardly and inwardly, respectively. In order to minimize the effect of aerodynamic drag on link 130, it is disposed within an existing hollow strut 119 supporting annular shroud 56. Actuator 134 is disposed proximate the engine centerline to minimize hydraulic complexity and to provide adequate cooling thereof.

The radially outer wall of duct 110 terminates in a translatable shroud 138 which is telescopically received within fan nacelle 34 and which may be deployed to an aft extending position by means of a suitable actuation system 140. Shroud 138 cooperates with articulated fan plug 118 to form a throat (minimum flow area) 142 therebetween. When shroud 138 is retracted (FIG. 2), the throat is formed at the trailing edge of the shroud while, in the extended mode (FIG. 3), shroud 138 and flap 116 cooperate to form an expansion surface to accelerate the flow.

In operation, in the low bypass, nonaugmented (duct burner 50 inoperative) mode, valve 106 is in the closed position relative to the outer duct flow (see FIG. 2), shroud 138 is retracted and throat area modulation is provided by articulated plug 118 which will be deployed by actuator 134 to its optimum position. As thrust level is increased, the throat area is increased by translating carriage 136 aft, thus moving plug 118 radially inwardly. In the high bypass operating mode, flap 106 is open (phantom position) with respect to the outer duct 30 (with plug 118 in the position of FIG. 3). The two duct streams are mixed aft of the inoperative duct burner 50 by means of the flap 106 which creates a favorable static pressure balance at the mixing plane.

In the augmented mode as depicted in FIG. 3, flap 106 is closed with respect to the outer duct stream and the augmented inner duct stream is permitted to pass through the relatively open throat area. The translatable shroud 138 is deployed as depicted to provide a controlled expansion surface, in cooperation with flap 116, for the expansion of the exhaust gases and to provide the throat area and nozzle area ratio variability to enable the fan nozzle to operate at its peak performance characteristic.

Thus, a simplified nozzle has been provided for multiple duct applications. The number of nozzles no longer must equal the number of duct flows to provide flow modulation and performance optimization throughout the mission cycle. In essence, the present invention provides for the necessary moving parts to serve dual functions to eliminate redundancy. Furthermore, this provides for simplicity in nozzle fabrication and a reduction in weight. And, finally, the exhaust nozzle structure of the present invention is mechanically feasible in that it integrates well with both existing and anticipated engines/airframes and utilizes realistic actuator systems to avoid weight penalties and mechanical instabilities. High performance maneuver loads can be tolerated by such a system.

It will be obvious to one skilled in the art that certain changes can be made to the above-described invention without departing from the broad inventive concepts thereof. For example, where multiple actuators are employed, they could be replaced with a single integrated actuation system. Further, actuators of any of several varieties may be employed. It is intended that the appended claims cover these and all other variations in the present invention's broader inventive concepts.

Having thus described the invention, what is considered novel and desired to be secured by Letters Patent of the United States is:

1. In a method of operating a propulsion nozzle for a gas turbine engine comprising a core engine, and two substantially coannular bypass flow ducts having a common wall therebetween, the steps of:
   modulating the relative flow rates through the ducts with valve means disposed at the downstream end of the common wall; and
   passing the sum of the duct flows through a variable area throat independent of the core engine and partially defined by an articulated plug and a cooperating circumscribing shroud.

2. In the method as recited in claim 1 the further steps of:
   mixing the coannular duct flows at a common mixing plane located at the downstream end of the valve means; and
   forming the throat at the downstream end of the shroud.

3. In the method as recited in claim 1 the further steps of:
   augmenting the energy level of the flow in one of the coannular ducts;
   blocking the flow through the other coannular duct with the valve means;
   extending the shroud in the downstream direction; and
   forming the throat upstream of the downstream end of the shroud.

4. In the method as recited in claim 1 the further step of:
   extending the shroud downstream of the throat, thereby modulating the nozzle throat to exit area ratio.

5. In a method of operating a propulsion nozzle for a gas turbine engine comprising a core engine, and two substantially coannular bypass flow ducts having a common wall therebetween, the steps of:
   passing separate subsonic flow streams through the coannular ducts;
   modulating the relative flow rates through the ducts at a common mixing plane using valve means disposed at the downstream end of the common wall; and
   passing the combined flows through a variable area throat independent of the core engine and partially defined by an articulated plug and a cooperating circumscribing shroud.

6. A propulsion nozzle for a multiple bypass duct gas turbine engine having a core engine, said nozzle comprising:
   an inner bypass flow duct partially circumscribing the core engine;
   an outer bypass flow duct partially circumscribing said inner bypass flow duct and separated therefrom by a common wall;
   variable position valve means disposed upon the downstream end of the common wall for modulating the relative flow rates through said inner and outer ducts;
   a translatable shroud; and
   an articulated annular plug, independent of the core engine, mounted within and cooperating with said shroud to define an exhaust duct therebetween having a throat and an exit, said exhaust duct disposed so as to receive flow from said inner and outer bypass ducts;
   wherein said articulated plug and said translatable shroud cooperate to modulate the throat area and the throat-to-exit area ratio as required.

7. The propulsion nozzle as recited in claim 6 further comprising a stationary wall further defining said exhaust duct and telescopically receiving said shroud within the downstream end thereof, and wherein said valve means comprises a flap adapted to cooperate with said wall to modulate the flow through said outer bypass flow duct.

8. The propulsion nozzle as recited in claim 7 further comprising actuation means to articulate said annular plug and wherein said actuation means is disposed within the radially inner core engine, and is link connected to said articulated plug through a strut connecting the core engine and said plug.

* * * * *